Patented July 5, 1932

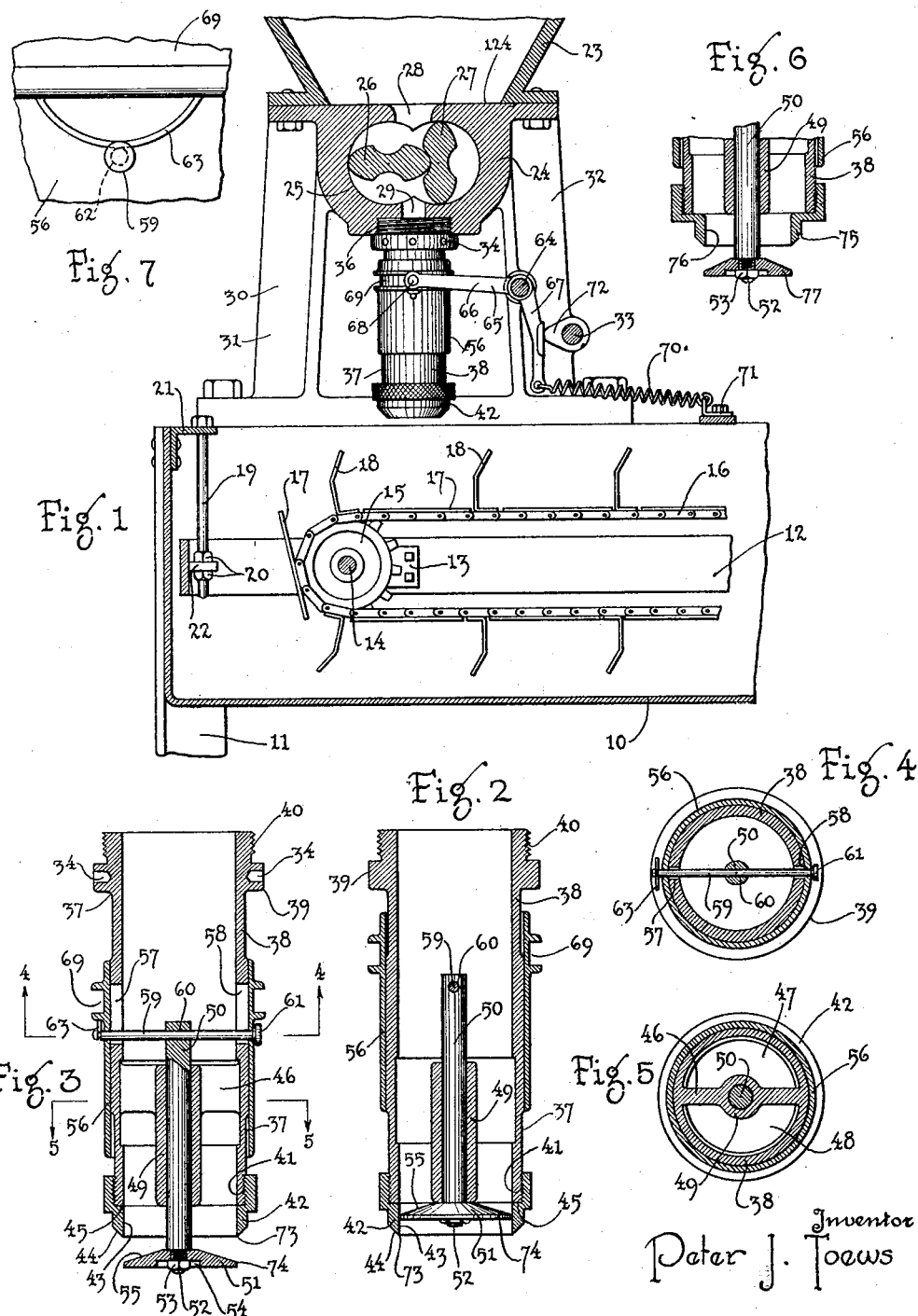

1,866,332

UNITED STATES PATENT OFFICE

PETER J. TOEWS, OF MINNEAPOLIS, MINNESOTA

DOUGHNUT FORMER

Application filed November 7, 1929. Serial No. 405,341.

My invention relates to doughnut formers and has for its object to provide a device by means of which doughnuts may be readily and positively formed for disposition in the doughnut cooking medium.

An object of the invention resides in providing a tube through which the raw dough is forced, said tube having a nozzle at the end thereof and in further providing a head movable toward and from said nozzle to form the doughnut and sever the same from the bulk of the dough and to free the formed doughnut from said head and nozzle.

Another object of the invention resides in maintaining the tube and nozzle stationary and in reciprocating the head relative to the nozzle.

A still further object of the invention resides in constructing said tube with a bridge having a bearing thereon, and in providing a shank for supporting the head slidable along said bearing.

Another object of the invention resides in constructing said nozzle and head detachable from said tube and shank to permit of readily replacing said nozzle and head as the same become worn and in substituting different sizes of nozzle and head to form different sizes of doughnuts.

A still further object of the invention resides in forming the tube with oppositely facing slots, and in employing a pin extending through said slots and through said shank for operating said head.

A feature of the invention resides in providing a sleeve slidable along the exterior of the tube and in extending said pin through said sleeve for the purpose of reciprocating said shank upon reciprocation of said sleeve, said sleeve serving to cover the slots in said tube.

An object of the invention resides in forming locking means for detachably connecting the pin to the sleeve to permit of rapidly demounting the structure for the purpose of cleaning or repair.

Other objects of the invention reside in the details of construction and in the novel arrangement and combination of parts hereinafter illustrated and/or described.

In the drawing:

Fig. 1 is a longitudinal sectional view of a portion of a doughnut machine illustrating an embodiment of my invention applied thereto.

Fig. 2 is a longitudinal elevational sectional view of the doughnut former proper removed from the doughnut machine and drawn to a larger scale.

Fig. 3 is a view similar to Fig. 2 taken at right angles thereto and showing the head in its lowermost position.

Fig. 4 is a cross sectional view taken on line 4—4 of Fig. 3.

Fig. 5 is a cross sectional view taken on line 5—5 of Fig. 3.

Fig. 6 is a fragmentary longitudinal sectional view of the doughnut former showing a different size nozzle and head attached to the same.

Fig. 7 is a fragmentary detail view illustrating the pin locking device of the invention.

For the purpose of illustrating the application of my invention, I have shown in Fig. 1 a portion of a doughnut machine indicated in its entirety at A. This machine may be of the type illustrated in the copending application of Frank M. Roehl and myself, Serial No. 316,144 filed October 31, 1928, or any other desired type where doughnuts are moved away from the doughnut former proper as the same are extruded therefrom. The portion of the machine shown comprises a tank 10 supported upon a framework including legs 11 which tank contains the usual cooking medium. Within said tank is disposed a movable frame 12 pivoted at one end relative to tank 10 and which is provided with bearings 13 journaling shafts 14 on which are rigidly secured sprocket wheels 15. Two chains 16 pass over these sprockets and carry blades 17 and outwardly extending paddles 18 which form a conveyer for conveying the formed doughnuts along the cooking medium as the same are being cooked. The frame 12 may be adjusted as to height by means of a bolt 19 and lock nuts 20 thereon which bolt is supported from a bracket 21 and passes through a lug 22 on said frame.

This portion of the doughnut machine not forming any feature of this particular invention has not been shown in its entirety but only enough thereof to illustrate the application of my invention thereto. It can be readily comprehended that any type of cooking device may be utilized in place of that shown without affecting the operation of the invention.

Above the tank 10 is disposed a dough hopper 23 which is mounted upon a dough feeding device 124. This device includes a case 24 which is bored as indicated at 25 to receive two revoluble blades 26 and 27 which cooperate with one another within the bore 25 and act as a gear pump. The bore 25 communicates through an opening 28 in case 24 with the hopper 23 and at its lower portion with a number of openings 29 through which the dough is extruded as the blades 26 and 27 rotate. The hopper 23 and the feed device 124 are carried upon end frame members 30 formed with legs 31 and 32 which are attached to the supporting structure for the tank 10 or which are mounted upon any suitable supports. A shaft 33 extends across and is journaled in the legs 32 and serves to operate the forming device of my invention which will be presently described in detail. The feed device 124 may be driven in any suitable manner so as to feed the dough into the doughnut former 37 as the same is required. Such construction being well known in the art has not been shown in this application.

Immediately below each of the outlets 29 of the feed device 124 the case 24 is internally threaded at 36 to receive a doughnut former indicated at its entirety at 37. This doughnut former is shown in detail in Figures 2 and 3. This device comprises primarily a tube 38 of a diameter somewhat less than that of the formed raw doughnut. This tube is constructed at the upper end thereof with a shoulder 39 formed with openings 34, and is threaded at 40 to screw into the threaded portions 36 of the feed device 124. By applying a spanner wrench to the holes 34 in portion 39 of said tube the same may be rigidly secured to the under side of the dough feeder case 24. The end of the tube 38 is externally threaded as designated at 41 to receive a nozzle 42 which is internally threaded to screw upon the same. The nozzle 42 is internally bored at 43 to the correct diameter and is at the extreme end 44 thereof bevelled to a sharp edge which prevents the formed doughnut from adhering thereto, and causes the positive freeing of the doughnut from the former. The bore 43 may be made as large as the sleeve 38 therein or larger if desired though I prefer to have the said bore of the same size or smaller. A shoulder 45 formed on the nozzle 42 serves to close the space between the end of said tube and nozzle to prevent the pocketing of dough in the operation of the device, and at the same time serves as a stop for positioning the nozzle relative to the end of the tube 38.

Within the interior of the tube 38 is formed a bridge member 46 which is relatively narrow and extends across the interior of said tube in diametral fashion as best shown in Fig. 5 to leave passageways 47 and 48 on either side thereof through which the dough may be forced past the said bridge member. On the center of this bridge member and along the axis of the tube is provided a longitudinal bearing or guide 49 which is constructed integral with the bridge member 46. Within this bearing is slidable a shank 50 which has attached to the extreme end thereof a head 51 cooperating with the nozzle 42 to form and free the raw doughnut.

For supporting the head 51 the lower end 52 of the shank 50 is reduced in diameter and threaded as best shown in Fig. 3. The head proper consists of a flattened conical disk which is centrally drilled and placed over the reduced portion 52 of shank 50. This disc is held in place thereon by means of a nut 53 screwed upon said reduced portion 52 which nut is received within a depression 54 in said head. The conical surface 55 of said head is disposed so as to face the nozzle 42 causing the flow of the dough more uniformly from the said nozzle when said head is in its lowermost position. The exterior diameter of the head 51 is substantially equal to or slightly less than the bore 53 of said nozzle so that the said nozzle may be withdrawn within said nozzle to effectively shear off the formed doughnut from the body of the dough as the head is moved into engagement with said nozzle.

Upon the exterior of the tube 38 is slidably mounted a sleeve 56. This sleeve is adapted to cover two oppositely disposed longitudinal slots 57 and 58 formed in said tube above the bridge 46. A pin 59 passes jointly through the slots 57 and 58, and a hole 60 in the end of shank 50 and also extends through the portion of the sleeve 56 overlying the slots 57 and 58. This pin is constructed with a head 61 by means of which the same may be manipulated and which prevents the same from passing completely through the sleeve 56. The other end of said pin is constructed with a groove 62 (Fig. 7) within which is engaged a spring latch 63 attached to the sleeve 56 which spring latch serves to hold the pin 59 in proper position. When it is desired to remove the pin 59, the same may be accomplished against the action of said spring permitting the withdrawal of said pin and the removal of the shank 50 from the bearing 49. By unscrewing the nozzle 42 the sleeve 56 may also be removed thereby enabling the operator to clean, repair, renew or substitute different parts whenever desired.

Upon reciprocation of the sleeve 56 along the exterior of the tube 38 the head 51 is caused to move from its position shown in Fig. 2 to that shown in Fig. 3 and vice versa. This is automatically accomplished in my invention as best illustrated in Fig. 1. Across the legs 32 of the frame structure 30 supporting the feeder 124 and the hopper 23 is journaled a rocker shaft 64 which has pivoted to it a bell-crank 65 formed with a forked arm 66 and a depending lever arm 67. The forked arm 66 is formed at the end thereof with facing pins 68 which are adapted to engage within a groove 69 formed in the exterior of the sleeve 56. The arm 67 has connected to it a tension coiled spring 70 which is also attached to a bracket 71 secured to the tank supporting the structure which spring serves to force the said sleeve downwardly. A cam 72 on shaft 33 engages arm 67 and moves the said arm 66 and sleeve 56 in opposition to the action of the spring 70 so as to cause the sleeve 56 to reciprocate as previously described. The shaft 33 may be driven from any suitable source of power as also the feeding device 124. In the preferred form of my invention, I desire to employ a number of doughnut forming devices such as shown in Figures 2 and 3 all in a row and fed from the same feeder. Such installation requires a corresponding number of bell-cranks 65 and a corresponding number of cams 72, the number of such units depending upon the width of the feeding device and the conveyer within the tank 10.

The operation of the invention is as follows: When the feeding device 124 is operated the blades 26 and 27 cause a pressure within the feeder chamber which forces the dough through the openings 29 and into the tubes 38. Within the said tubes the dough divides and passes past the pin 59 and bridge 46 and through the openings 47 and 48 into the lower portion of the tube where the nozzle 42 is disposed where the same unites again. When the head 51 is disposed as shown in Fig. 3 the dough passes through the nozzle 42 and is extruded through the space between the lowermost edge 73 of said nozzle and the conical surface 55 of head 51 the same taking the form of an annulus as it is forced out of the former. As the shaft 33 rotates, cam 72 shifts the arm 67 of bell-crank 65 outwardly raising the sleeve 56 and with it the head 51. This brings the outer edge 74 of the said head into communication with the edge 73 of the former 42 which causes the severance of the formed doughnut from the major body of the dough. Due to the weight of the formed doughnut and the exceedingly small surface of the former with which the same is in contact the formed doughnut drops from the former and into the cooking medium below the same within tank 10 where the formed doughnut is cooked and conveyed in the customary manner. Where the feed device 124 is positively driven, a bypass forming a relief for the pressure within the tube 38 must be provided to prevent the leakage of dough past the head 58 and to deliver the same back into the hopper 23. Where the feeder is intermittently operated such provisions need not be made. The desired results may be accomplished in any number of different ways and do not form any particular feature in this invention, such construction hence not being shown in this application.

If it is desired to form a smaller doughnut than that illustrated in Figures 2 and 3, the nozzle 42 may be unscrewed and in place thereof another nozzle 75 may be screwed to the said tube which nozzle is formed with a smaller internal bore 76 than that of nozzle 42. Similarly the head 51 may be detached from shank 50 and another head 77 may be employed whose external diameter corresponds to the bore 76 of the nozzle 75. When such construction is used, provision must be made to cause the feeder 24 to deliver the requisite amount of dough to give the desired weight to the raw doughnut which would be less than that required for a larger doughnut.

My invention is highly advantageous in that an extremely simple and effective device is provided whereby doughnuts may be positively and effectively formed and delivered from the former proper. The device may be easily dismounted and taken apart to permit of repair, renewal or substitution of parts. Different sizes of doughnuts may be readily formed with the same former and the parts therefor may be quickly and readily substituted for other parts when the occasion requires. By mounting the parts as shown and moving the head relative to the fixed nozzle an extremely simple and positive construction is provided whereby the doughnut may be readily formed and freed from the device. The former may be used in conjunction with any existing form of doughnut machine in which the doughnut is dropped into the cooking medium, and with any type of feeder providing sufficient pressure to extrude the doughnut from the former.

Changes in the specific form of my invention, as herein disclosed, may be made within the scope of what is claimed without departing from the spirit of my invention.

Having described my invention, what I claim as new and desire to protect by Letters Patent is:

1. A doughnut former comprising a tube, a nozzle at the end of said tube, a bridge extending across said tube, a bearing formed on said bridge, a shank slidable along said bearing, a head on said shank movable toward and from said nozzle, said tube having slots along the sides thereof, a sleeve slidable upon the exterior of said tube, and a single pin extending through said slots and engaging said shank and sleeve for operating said head upon the reciprocating of said sleeve.

2. A doughnut former comprising a tube, a nozzle at the end of said tube, a bridge extending across said tube, a bearing formed on said bridge, a shank slidable along said bearing, a head on said shank movable toward and from said nozzle, said tube having slots along the sides thereof, a sleeve slidable upon the exterior of said tube, a pin extending through said slots and engaging said shank and sleeve for operating said head upon the reciprocating of said sleeve, said pin extending completely through said sleeve and having a groove formed in the protruding end thereof, and a keeper attached to said sleeve for engagement within said groove to hold said pin detachably secured to said sleeve and shank.

3. A doughnut former comprising a tube, a nozzle at the end of said tube, a bridge extending across said tube, a bearing formed on said bridge, a shank slidable along said bearing, a head on said shank movable toward and from said nozzle, said tube having slots along the sides thereof, a sleeve slidable along the exterior of said tube and covering said slots, a pin extending through said slots and engaging said shank and sleeve for operating said head upon reciprocation of said sleeve, said pin extending completely through said tube and sleeve, and means for holding said pin detachably secured to said sleeve and shank.

4. A doughnut former comprising a tube, a nozzle at the end of said tube, a shank, means within said tube for slidably supporting said shank, a head on said shank movable toward and from said nozzle, said tube having slots along the sides thereof, a member movable along the exterior of said tube, a pin extending through said slots and engaging said member, said pin operating to reciprocate said shank upon movement of said member, said pin having a groove formed in one end thereof, and a keeper attached to said member for engagement with the pin in said groove to hold said pin detachably secured thereto.

5. A doughnut former comprising a tube, a nozzle at the end of said tube, a bridge extending across said tube, a bearing formed in said bridge, a shank slidable along said bearing, a head on said shank movable toward and from said nozzle, said tube having slots along the sides thereof, a sleeve slidable along the exterior of said tube and covering said slots, means extending through said slots and engaging said shank and sleeve for operating said head upon reciprocation of said sleeve, said sleeve being of a length such that the lower end of said sleeve falls short of the end of said nozzle throughout the movement of said sleeve upon said tube.

In testimony whereof I have affixed my signature to this specification.

PETER J. TOEWS.